(12) United States Patent
Ayestaran Lazcano et al.

(10) Patent No.: US 8,468,695 B2
(45) Date of Patent: Jun. 25, 2013

(54) MACHINE AND METHOD FOR MACHINING CRANKSHAFT ENDS

(75) Inventors: Francisco Maria Ayestaran Lazcano, Elgoibar (ES); Gorka Gorrochategui Salaberria, Elgoibar (ES)

(73) Assignee: Etxe-Tar, S.A., Elgoibar (Guipuzcoa) (ES)

( * ) Notice: Subject to any disclaimer, the term of this patent is extended or adjusted under 35 U.S.C. 154(b) by 327 days.

(21) Appl. No.: 12/867,947

(22) PCT Filed: Feb. 20, 2008

(86) PCT No.: PCT/ES2008/000091
§ 371 (c)(1),
(2), (4) Date: Sep. 27, 2010

(87) PCT Pub. No.: WO2009/103825
PCT Pub. Date: Aug. 27, 2009

(65) Prior Publication Data
US 2011/0005074 A1    Jan. 13, 2011

(51) Int. Cl.
*B23P 17/00*    (2006.01)

(52) U.S. Cl.
USPC ............ 29/888.08; 29/6.01; 29/558; 82/106; 409/203

(58) Field of Classification Search
USPC ................... 29/6.01, 888.08, 38 E; 403/131, 403/158, 192, 203
See application file for complete search history.

(56) References Cited

U.S. PATENT DOCUMENTS

| | | | |
|---|---|---|---|
| 6,233,810 B1 * | 5/2001 | Asbeck | 29/563 |
| 6,684,500 B1 * | 2/2004 | Kohlhase et al. | 29/888.08 |
| 7,507,193 B2 * | 3/2009 | Prust et al. | 483/1 |
| 2005/0081351 A1 | 4/2005 | Robotta et al. | |

\* cited by examiner

*Primary Examiner* — David Bryant
*Assistant Examiner* — Lawrence Burkart
(74) *Attorney, Agent, or Firm* — Notaro, Michalos & Zaccaria P.C.

(57) ABSTRACT

A machine which comprises two machining heads (1, 2) designed to machine crankshaft (5) ends and two machining stations (3, 4) designed to receive and secure at least one crankshaft (5). The machining stations (3, 4) are disposed between the two machining heads (1, 2). The crankshafts (5) are mounted in such a manner as to be disposed parallel to each other and oriented at 180°.

8 Claims, 8 Drawing Sheets

MACHINE AND METHOD FOR MACHINING CRANKSHAFT ENDS

TECHNOLOGICAL FIELD

The present invention belongs to the field of machine tools. In particular, the present invention relates to a machine and a process for machining crankshaft ends in such a manner as to reduce downtimes and maximise productivity.

BACKGROUND OF THE INVENTION

There are two alternatives for carrying out the machining of crankshaft ends.

There are environments wherein high production demands prevail, such as for example the automobile industry. In these sectors, dedicated transfer machines are mainly used, which have high effectiveness but very low flexibility for adapting to changes in the characteristics of the crankshafts to be machined. Therefore, high production is achieved at the expense of low flexibility with regard to changes in crankshaft machining.

However, in other sectors where machining centres are used, a high degree of flexibility is reached which allows fast assimilation of changes in the characteristics of the crankshafts to be machined but at the expense of low productivity.

A transfer machine is a machine wherein a part is transported from station to station, being machined at each station with units on either side of the part, a specific operation of the crankshaft end, in such a manner that the crankshaft ends have been machined in their entirety.

In the machining centre one end is firstly machined, changing the tool to carry out the different machining operations; the part is rotated using a plate to position it facing the other end of the crankshaft and, changing the tool, the machining operations are carried out at the other end.

In both cases, once the crankshaft has been machined, it must be unloaded and dismounted in order to subsequently load and mount a new crankshaft. The duration of this process, while shorter than that of machining, is by no means negligible and should be taken into account in the design of the machining machine.

At present, an evolution has taken place in the automobile sector which, while maintaining the same high levels of production, requires the flexibility inherent to low-production solutions in order to adapt the product to market demands.

The solution to this flexibility and productivity problem should also take into account that machining of the crankshaft ends is not symmetrical, i.e. the machining of the first crankshaft end or spike end is carried out in less time than the machining of the second crankshaft end or flange end. The relationship between both times is such that machining of the spike end can be carried out in 75% of the machining time of the flange end. This leads to the existence of numerous downtimes due to the disparity in machining times for each of the ends of a crankshaft. Additionally and as mentioned earlier, the moment in which the unloading/dismounting and loading/mounting tasks are carried out must be taken into account in order to minimise their impact on the total duration of the process.

In the state of the art, no solution is known which allows ad hoc machining of each crankshaft, in such a manner that productivity is not substantially reduced with respect to transfer machine productivity and downtimes are minimised.

DESCRIPTION OF THE INVENTION

In a first aspect, the invention relates to a machine for machining crankshaft ends which comprises two machining heads, a first machining head and a second machining head, said first and second machining heads being configured to machine crankshaft ends, and two machining stations, a first machining station and a second machining station, said first and second machining stations configured to receive and secure at least one crankshaft. The configuration of these elements is such that the first and second machining stations are disposed between the first machining head and the second machining head. In this manner, the first machining head will machine a first end of the crankshaft or crankshafts disposed in the first or second machining stations, while the second machining head will machine the second end of said crankshafts. The machine will comprise control means responsible for managing the first and second machining station and the first and second machining station.

In accordance with the invention, the, at least one, crankshaft mounted on the first machining station is disposed parallel and 180° from the, at least one, crankshaft mounted on a second machining station. Likewise, the first machining head and second machining head are positioned facing the ends of the crankshafts of the first machining station and second machining station. The first machining head and second machining head can be moved in such a manner as to face the crankshafts of the first machining station or second machining station, depending on the crankshafts to be machined.

The machine of the invention will be equipped with two machining stations, in such a manner that crankshaft assemblies will be disposed thereon, so that if in a first crankshaft assembly, secured to a first machining station, the first machining head machines a flange end, in the second crankshaft assembly, disposed in the second machining station, the second machining head will also machine a flange end. In this manner, alternating a single head for machining spike and flange ends will allow the elimination of downtimes from those configurations which must wait until the machining of the flange end finishes before starting to machine a new spike end.

The control means act in such a manner that the machine functions as follows. Initially, the control means will order the machining of a first end and a second end of at least one crankshaft disposed in the first machining station by the first and second machining head, respectively, until reaching a spike configuration at the first end and a flange configuration at the second end. Parallel to this process, the control means will order the loading and mounting of at least one crankshaft onto the second machining station. In this manner, the second machining station will be ready to machine the, at least one, loaded and mounted crankshaft. When in the machining of the first end of the crankshaft, carried out by the first machining head disposed in the first machining station, reaches a spike configuration, the control means will proceed to order the first machining head to machine a first end of the, at least one, crankshaft disposed in the second machining station, until reaching a flange configuration at the first end. When the second machining head finishes machining the second end of the crankshaft disposed in the first machining station, reaching a flange configuration, the control means will order the second head to machine a second end of the, at least one, crankshaft disposed in the second machining head until reaching a spike configuration at the second end. At that time, no work is being carried out at the first machining station; therefore, taking advantage of this fact, the control means will order the unloading and dismounting of the, at least one, machined crankshaft in said machining station, also taking advantage to load and mount at least one new crankshaft in said machining station. While the unloading, dismounting, loading and mounting takes place at the first machining station, the second machining station will be machining the, at least one, crankshaft loaded and mounted onto said machining station. The ability to carry out the unloading, dismounting, loading and mounting of the machined and non-machined crankshafts without having to machine the crankshafts constitutes one of the advantages of the machine of the invention. In this manner, the unloading, dismounting, loading and mounting time is not added to machining time, therefore reducing total crankshaft machining time.

When a spike configuration is reached in the machining of the second end of the crankshaft disposed in the second machining station, the control means will order the second machining head to machine a second end of the, at least one, crankshaft disposed in the first machining station until reaching a flange configuration. Upon completion of the machining of the first end of the crankshaft disposed in the second machining station, reaching a flange configuration, the control means will order the first machining head to machine a first end of the, at least one, crankshaft disposed in the first machining station until reaching a spike configuration. At that time, no work of any kind is being carried out at the second machining station, due to which at that time the control means will order the unloading and dismounting of the, at least one, crankshaft of the second machining station and the loading and mounting of a new crankshaft onto the second machining station. While this operation is being carried out, at the first machining station the, at least one, crankshaft disposed therein is being machined. As mentioned earlier, the ability to unload and dismount the machined crankshafts and load and mount new crankshafts, without adding the time required for this process to the time required for machining the crankshafts, is one of the advantages of the machine of the invention.

Additionally, the first machining station and the second machining station may be permanent stations. Said stations may be secured to a bedplate and therefore immobilised.

The first machining head and the second machining head may be configured to move in the direction of three orthogonal axes. These movements shall be along a first "X" axis for the horizontal movement of the machining heads, from the first machining station to the second machining station, along a second "Y" axis for the vertical movement of the machining heads, enabling tool change, and along a third "Z" axis for tool machining feed.

The first machining head and the second machining head may comprise a tool repository. In said repository, the possible tools that may be required by the heads for machining the ends of crankshaft ends will be available.

The first machining station and the second machining station may comprise at least one crankshaft securing element. At least one of the ends of said securing element may be mobile. These elements allow the machining stations to secure any type of crankshaft for machining the ends thereof.

In a second aspect, the invention relates to a process for machining crankshaft ends. Said process comprises a stage wherein a first end and a second end of at least one crankshaft disposed in a first machining station are machined until reaching a spike configuration at the first end and a flange configuration at the second end. As mentioned earlier, machining of the first end will take less time than machining of the second end.

While machining is being carried out at the first machining station, at least one crankshaft will be loaded and mounted onto a second machining station. The number of crankshafts will normally be the same as those being machined at the first machining station, typically two, although other configurations having one, three or four crankshafts could also be accepted.

Once a spike configuration has been reached at the first end of the, at least one, crankshaft disposed in the first machining station, a first end of the, at least one, crankshaft disposed in the second machining station will be machined until reaching a flange configuration at this first end. Therefore, the machining process passes from machining a spike configuration, of short duration, to machining a flange configuration, of long duration. Alternating these two configurations, as will be seen later, enables balancing of the machining time at both ends of the crankshafts.

Upon completion of the machining of the second end of the, at least one, crankshaft disposed in the first machining station, i.e. when a flange configuration is reached at said end, a second end of the, at least one, crankshaft disposed in the second machining station is machined until reaching a spike configuration at the second end.

At that time, no work is being carried out on the, at least one, crankshaft disposed in the first machining station, due to which the, at least one, crankshaft of the first machining station can be unloaded and dismounted and a new crankshaft can be loaded and mounted onto the first machining station. Therefore, the operations for loading and mounting and unloading and dismounting new crankshafts will not interrupt the production process, as these will take place while the second machining station is machining the, at least one, crankshaft disposed in said machining station, thereby reducing downtimes and increasing productivity.

In a similar manner to process followed in the case of the, at least one, crankshaft of the first station, when the machining of the second end of the crankshaft disposed in the second machining station reaches a spike configuration, the second end of the, at least one, crankshaft disposed in the first machining station will be machined until reaching a flange configuration. Likewise, when the machining of the first end of the crankshaft disposed in the second machining station reaches a flange configuration, a first end of the, at least one, crankshaft disposed in the first machining station is machined until reaching a spike configuration.

Finally the, at least one, crankshaft of the second machining station will be unloaded and dismounted and at least one new crankshaft will be loaded and mounted onto the second machining station. As in the case of the loading and mounting of new crankshafts onto the first machining station, the loading and mounting of the new crankshafts in the second machining station will be carried out while the, at least one, crankshafts disposed in said machining station are being machined in the first machining station. Therefore on carrying out the unloading, dismounting, loading and mounting work while the, at least one, crankshafts are being machined in the first machining station, the time used for this work is not added to the machining process, therefore reducing machining time. The fact that the machining heads alternate the machining of the ends with flange configuration and spike configuration, with different machining times for each, also contributes to reducing the time required for machining.

This process could be repeated indefinitely for the purpose of continuously obtaining crankshafts.

As already mentioned throughout the description of the present invention, the described machine and process allows the machining of crankshaft ends, preferably for the automobile industry, in such a manner that the machine does not remain idle at any time, due to the fact that it alternates each machining head in the execution of ends having a spike and flange configuration. In this manner, it substantially improves the productivity of the means known in the state of the art for machining crankshaft ends. Additionally, as mentioned earlier, the unloading and dismounting processes of the already machined crankshafts and the loading and mounting of new crankshafts onto a machining station is carried out while the machine is machining crankshafts at the other machining station. Therefore, these tasks do not represent a delay in the machining process, as they can be carried out at a machining station while another machining station is working.

DESCRIPTION OF THE DRAWINGS

In order to complement the description being made and for the purpose of helping to better understand the characteristics of the invention, a set of drawings has been included as an integral part of said description wherein the following have been represented in an illustrative and non-limiting manner.

PREFERRED EMBODIMENT OF THE INVENTION

In reference to the figures, a preferred embodiment of the machine for machining crankshaft (5) ends that constitutes the object of this invention is described below.

Figure 1:
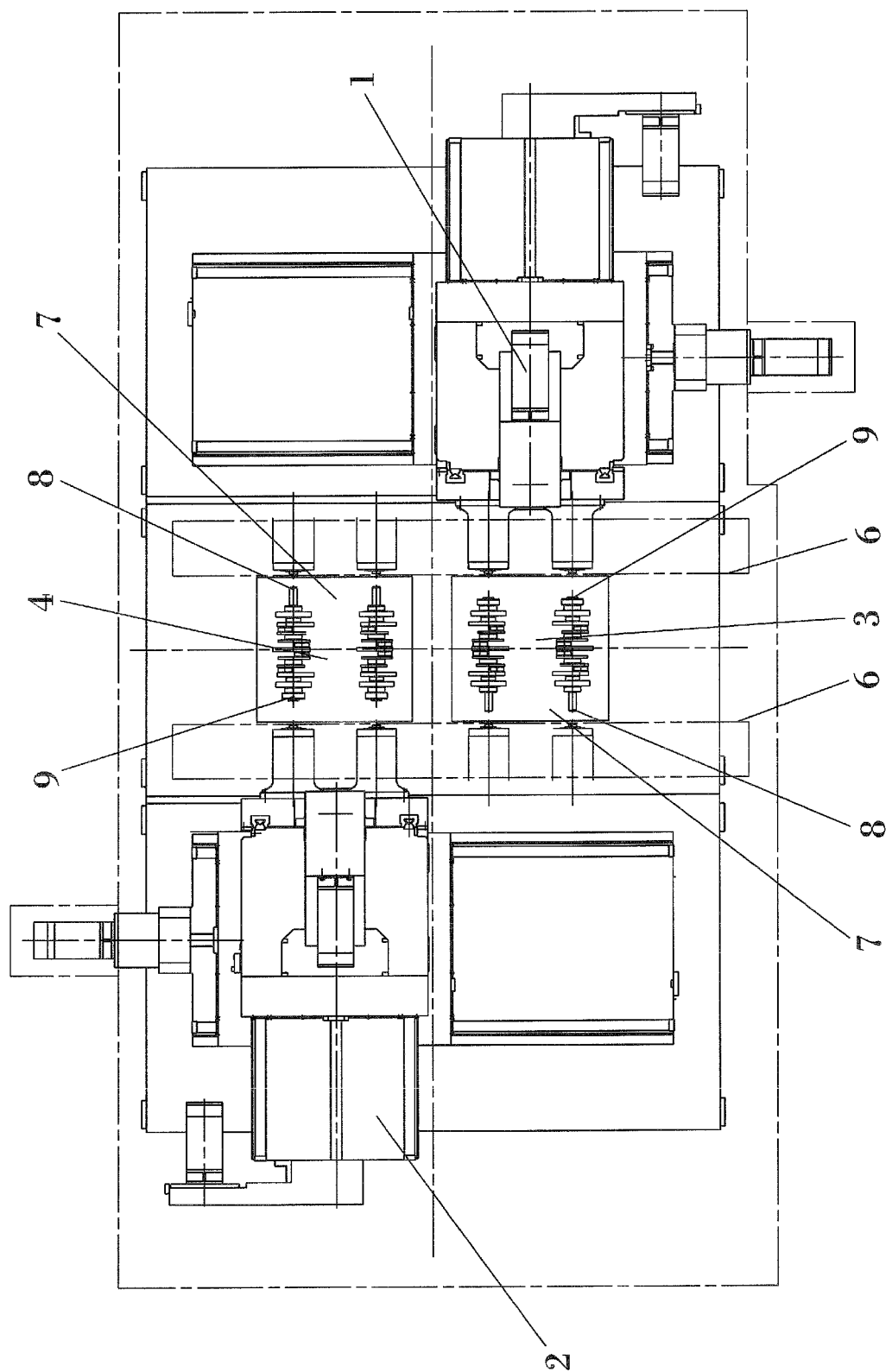
FIG. 1 shows a plan view of the machine of the invention.

FIG. 1 shows two machining stations (3, 4), a first machining station (3) and a second machining station (4). In order to adapt to the different types of crankshafts (5) and their lengths, at least one end of these securing elements (7) could be mobile. The crankshafts (5) mounted onto the first machining station (3) and onto the second machining station (4) will be secured in such a manner as to remain disposed parallel to each other and oriented at 180°, i.e. both the first machining head (1) and the second machining head (2) will be positioned facing the flange ends (9) of one of the pairs of crankshafts (5) and spike ends (8) of the other pair of crankshafts (5).

Figure 2:
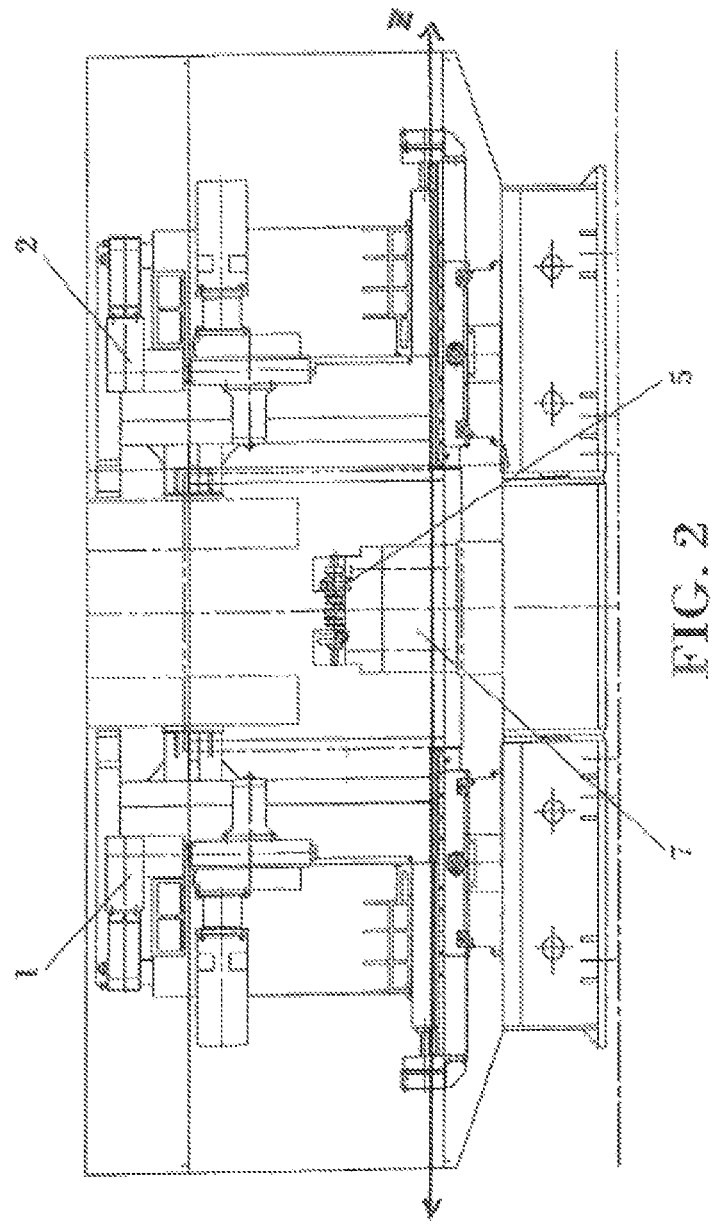
FIG. 2 shows a side view of the machine of the invention.
Figure 3:
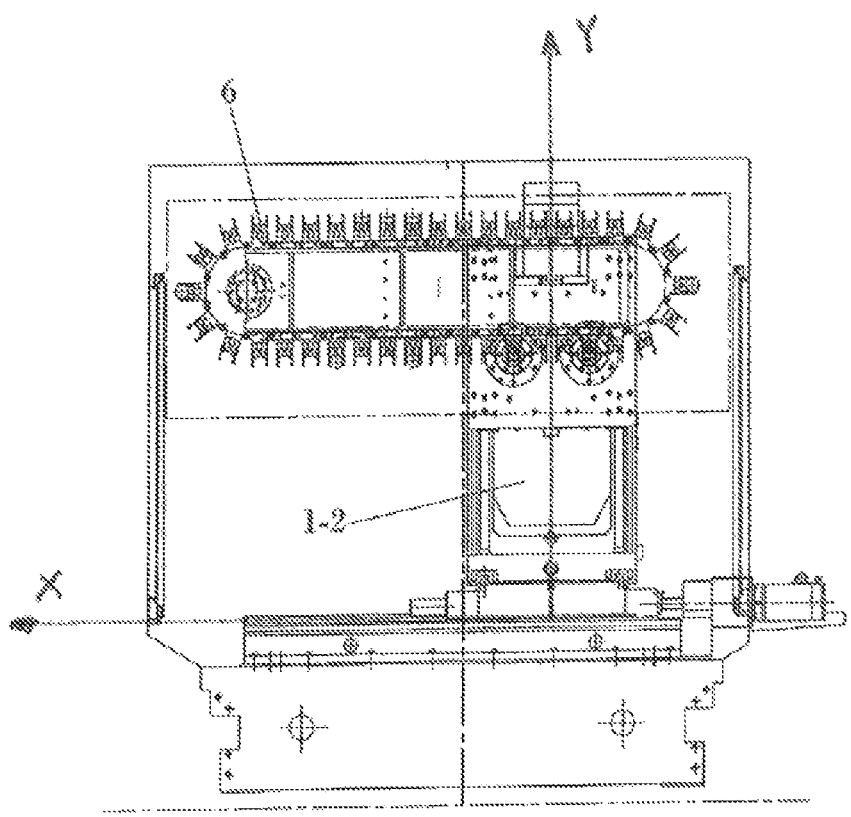
FIG. 3 shows a front view of one of the two machining heads.

FIG. 1 also shows the two machining heads (1, 2), the first machining head (1) and the second machining head (2). Both machining heads (1, 2) have, respectively, a tool repository (6) with which to select the necessary tool for machining the end of the crankshaft (5) at all times. The movement for performing said tool change is carried out along a "Y" axis. Said machining heads (1, 2) can move along an "X" axis from one of the machining stations (3, 4) to another of said machining stations (3, 4). Finally, movement along a "Z" axis enables machining of the crankshafts (5). This can be observed in greater detail in FIGS. 2 and 3: the "Z" axis in FIG. 2 and the "X" and "Y" axes in FIG. 3.

FIGS. 4A-4E illustrate the successive layouts of the machining heads (1, 2) on carrying out machining of the crankshafts (5) in accordance with the method described in the present invention.

Figure 4A:
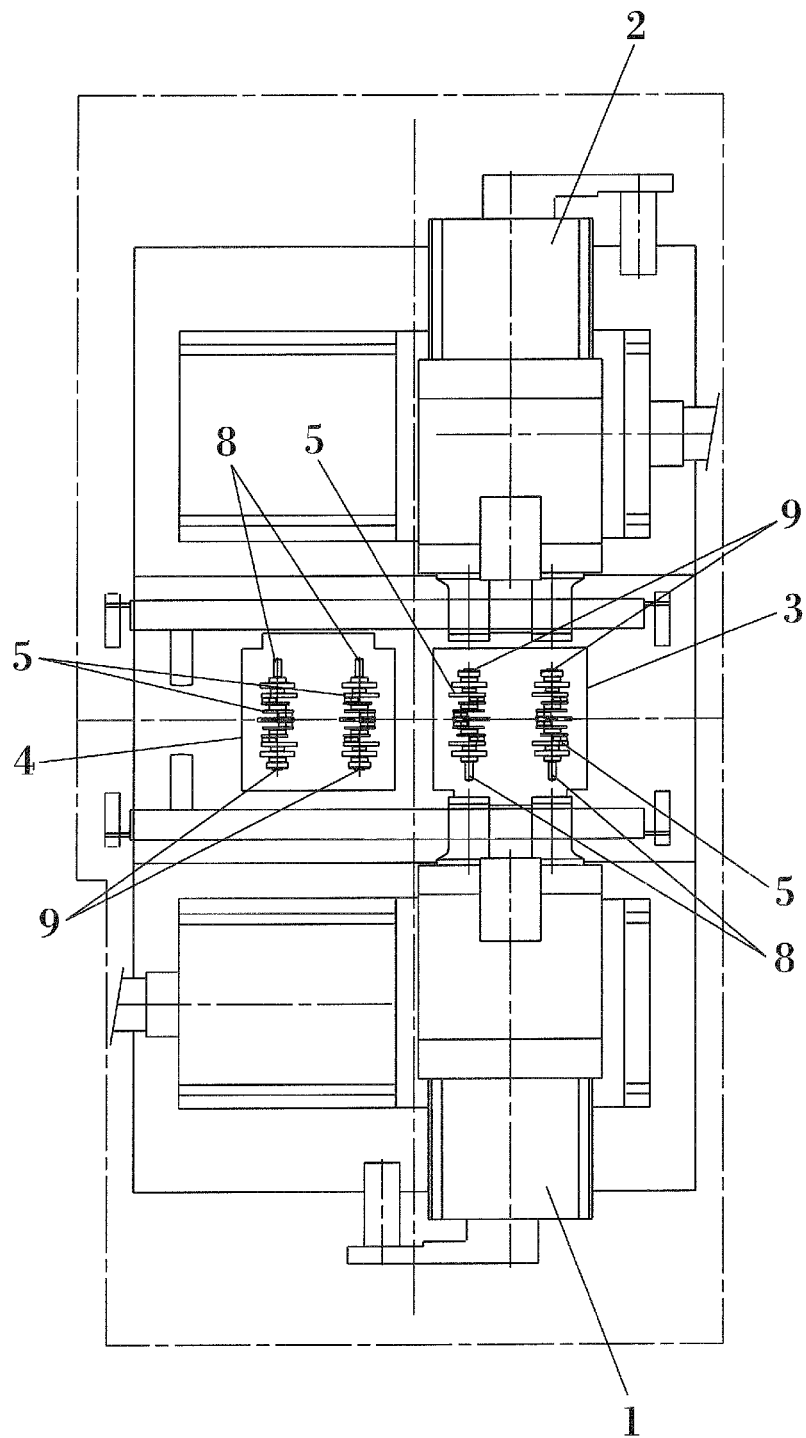
FIG. 4A-4E shows the sequence of stages executed by the machine of the invention for machining crankshaft ends.
Figure 4B:
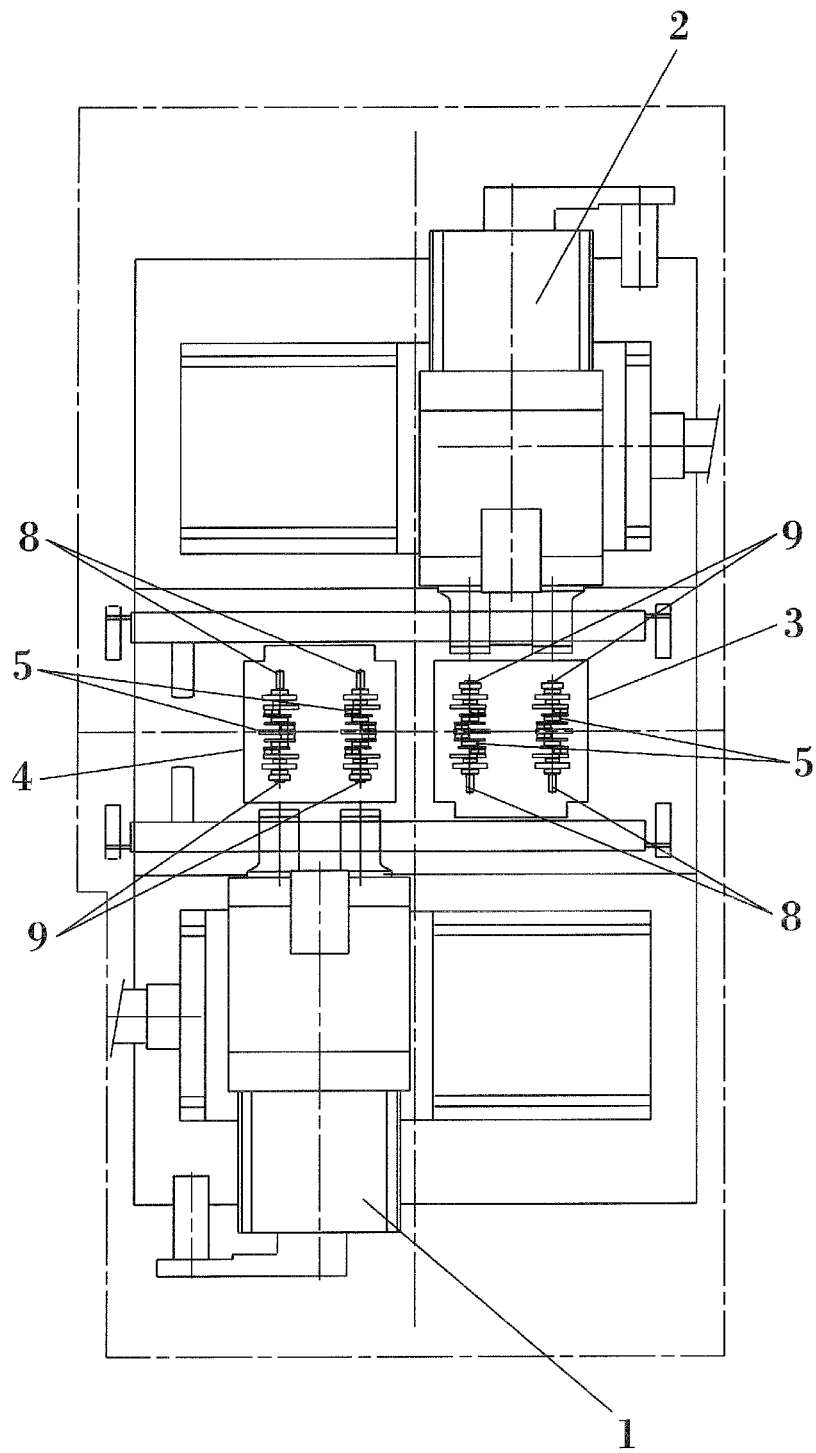

At an early stage, FIG. 4A, both the first head and the second head are machining the two crankshafts (5) disposed in the first machining station (3). The objective of this machining is to obtain a spike end (8) at the first end of the crankshafts (5) machined by the first machining head (1) and a flange end (9) at the second end of the crankshafts (5) machined by the second machining head (2).

As mentioned earlier, the first machining head (1) will finish before the second machining head (2) finishes its operation. When it finishes, it will move on to the second machining station (4) in order to machine a flange end (9). This situation can be observed in FIG. 4B, wherein the second machining head (2) continues machining the flange end (9) of the crankshafts (5) disposed in the first machining station (3). The two crankshafts (5) of the second machining station (4) must position themselves accordingly prior to completion of the machining of the spike end (8) of the crankshafts (5) of the first machining station (3).

Figure 4C:
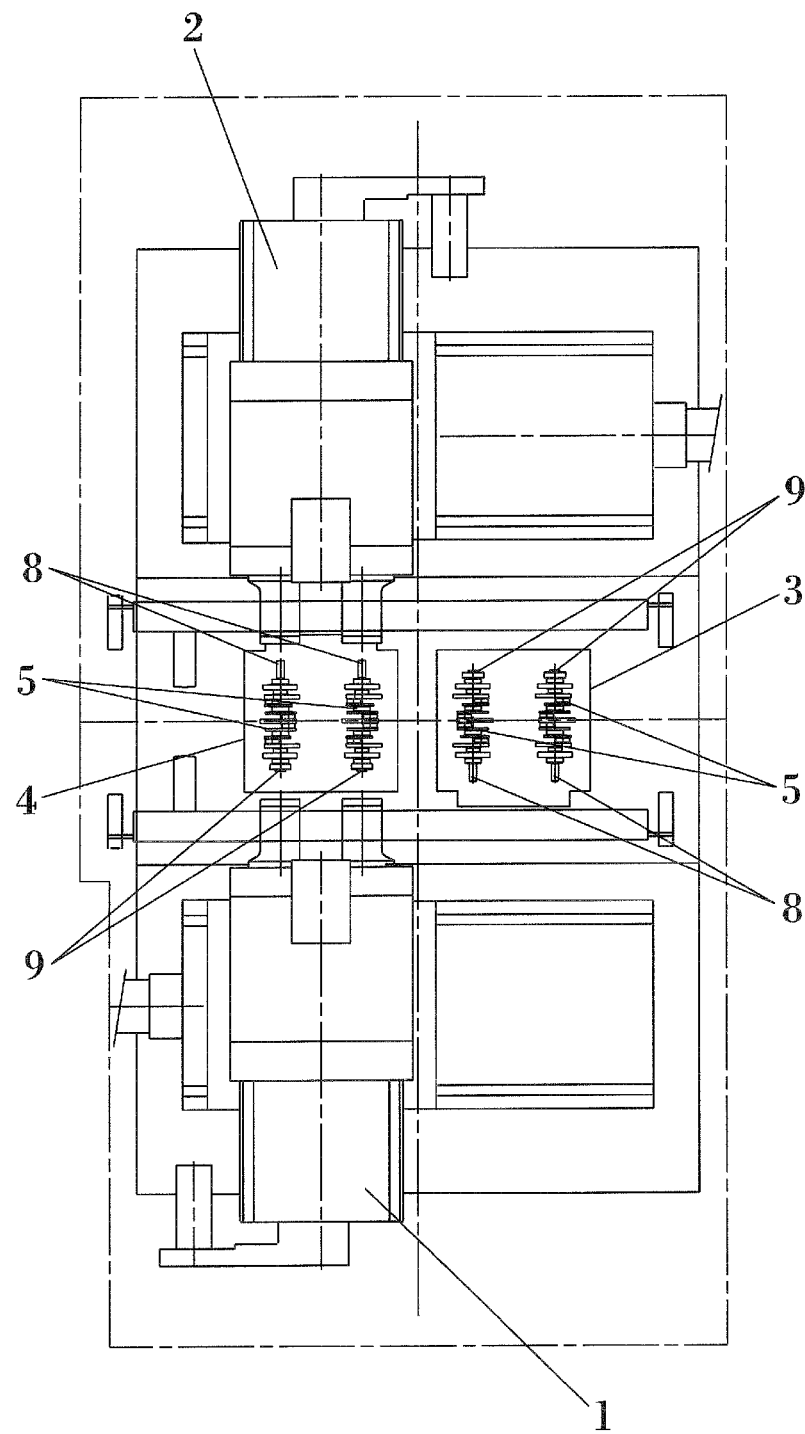

FIG. 4C represents the moment in which the second machining head (2) has finished machining the flange end (9) of the crankshafts (5) disposed in the first machining station (3) and therefore moves towards the second machining station (4) for machining a spike end (8) on the crankshafts (5) of the second machining station (4). At that time, the crankshafts (5) of the second machining station (3) have already been machined, due to which, while the crankshafts (5) of the second machining station (4) are being machined, they can be dismounted and removed and new crankshafts (5) positioned and mounted for machining thereof.

Figure 4D:
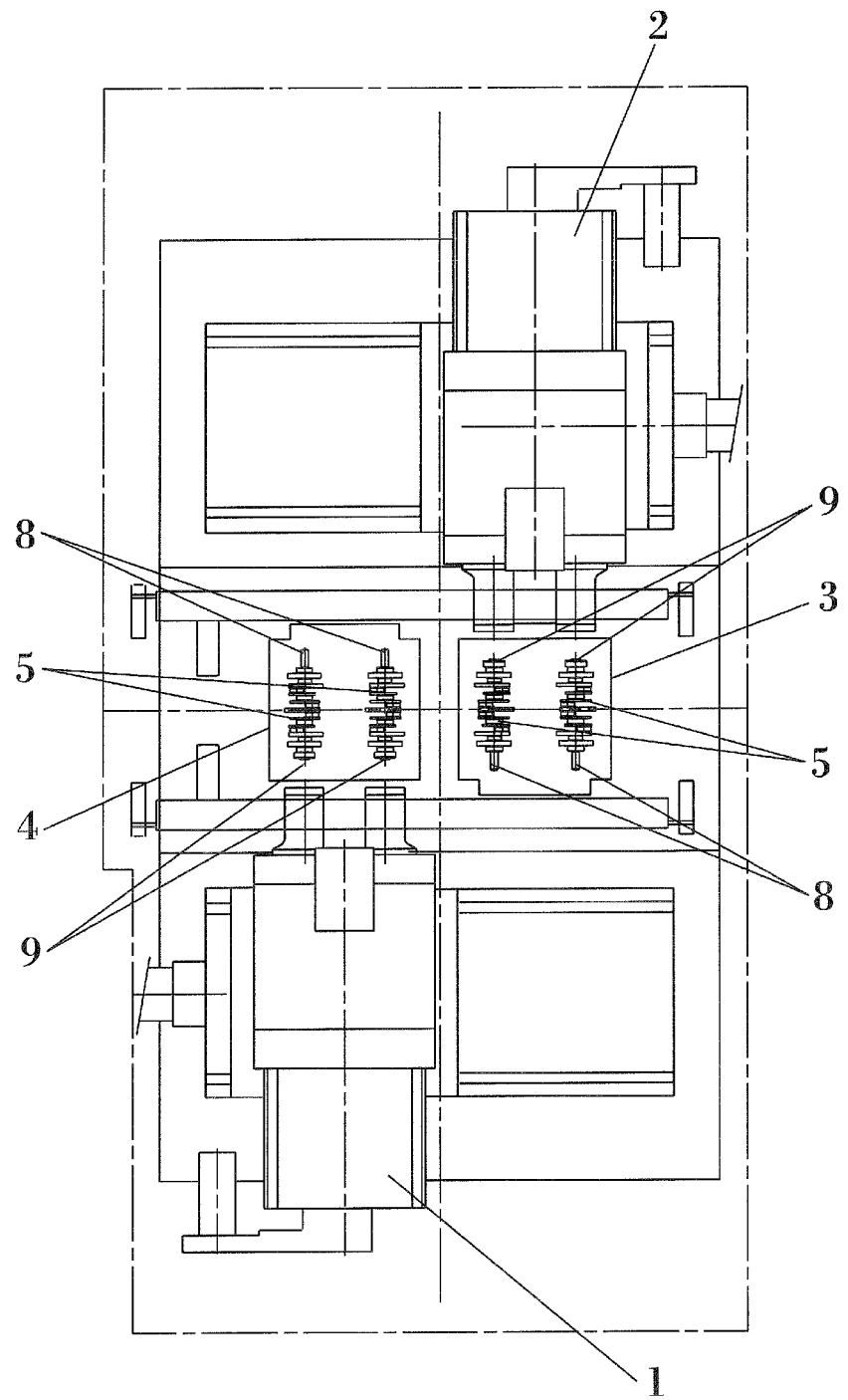

FIG. 4D shows how the second machining head (2), moves towards the first machining station (3) to machine a flange end (9) once the spike end (8) of the crankshafts (5) of the second machining station (4) has been machined. Meanwhile, the first machining head (1) finishes machining of the flange end (9) of the crankshafts (5) of the second machining station (4).

Figure 4E:
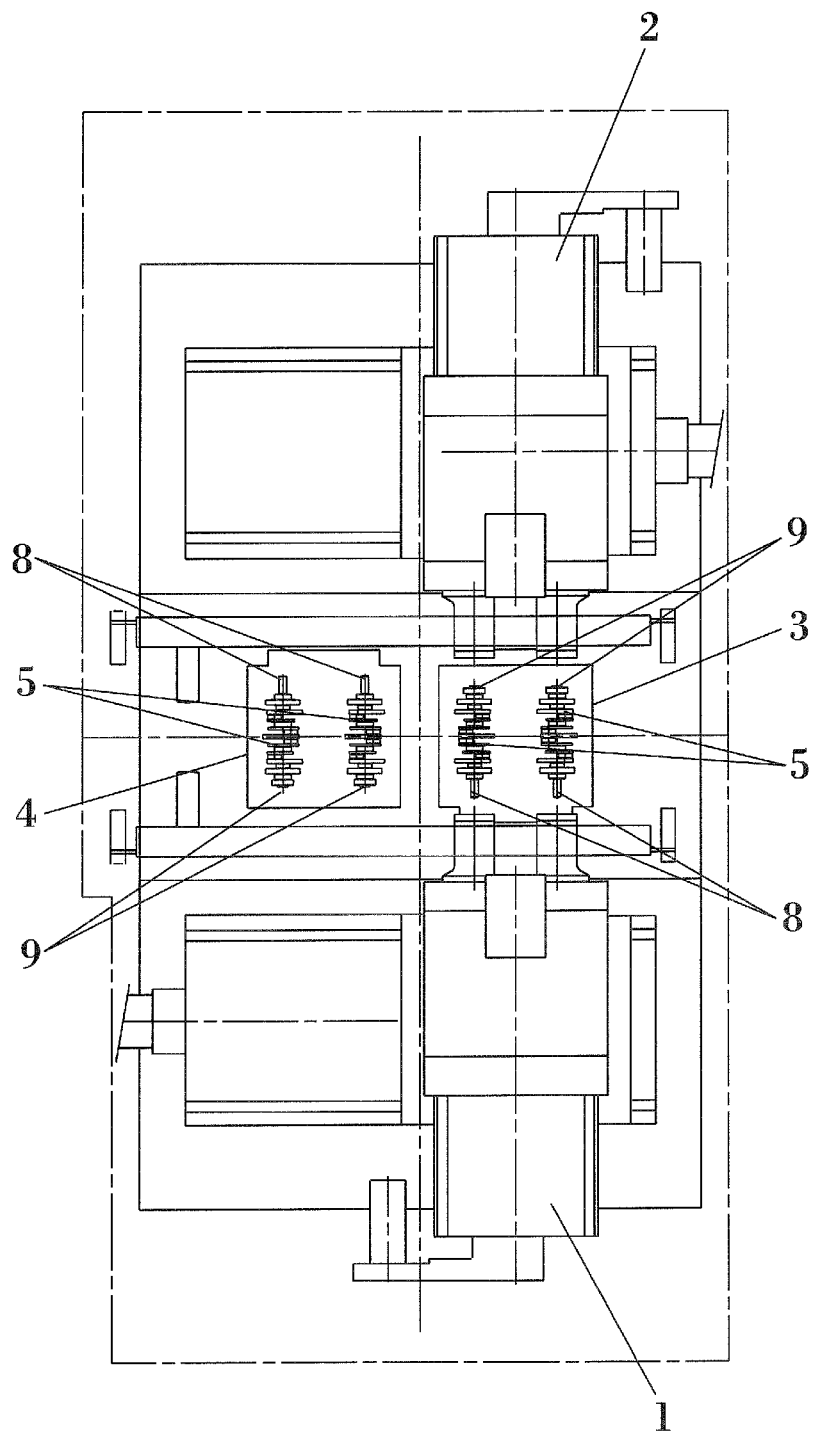

The cycle is completed in FIG. 4E. In this figure, the first machining head (1) has completed the flange end (9) of the crankshafts (5) of the second machining station (4) and can therefore move on to the first machining station (3) to machine a spike end (8). On moving towards the first machining station (3), the two crankshafts (5) of the second machining station (4) can be dismounted and removed and substituted for new ones, mounting and loading said new crankshafts (5). Therefore, the cycle ends with this last stage and the process can continue to obtain two new pairs of crankshafts (5).

Based on this description and set of figures, a person skilled in the art will understand that the invention has been described according to a preferred embodiment thereof, but that multiple variations may be introduced into said preferred embodiment, without deviating from the object of the invention as it has been claimed.

The invention claimed is:

1. A machine for machining crankshaft (5) ends comprising:

two machining heads (1, 2), a first machining head (1) and a second machining head (2), said first and second machining head (1, 2) being configured for machining crankshaft (5) ends;

two machining stations (3, 4), a first machining station (3) and a second machining station (4), said first and second machining stations (3, 4) being configured to receive and fix at least one crankshaft (5), said first and second machining stations (3, 4) being disposed between the first machining head (1) and the second machining head (2), and control means;

wherein a first crankshaft (5) can be mounted onto the first machining station (3) parallel and at 180° to a second crankshaft (5) mounted onto the second machining station (4);

wherein the first machining head (1) and the second machining head (2) are designed to be positioned facing the ends of the crankshafts (5) of the first machining station (3) and second machining station (4); and wherein the control means are configured to order the following functions:

the machining of a first end and a second end of the first crankshaft (5) disposed in the first machining station (3) until reaching a spike configuration (8) at the first end and a flange configuration (9) at the second end, the loading and mounting of the second crankshaft (5) onto the second machining station (4), when in the machining of the first end of the first crankshaft (5) disposed in the first machining station (3) a spike configuration (8) is reached, the machining of the first end of the second crankshaft (5) disposed in the second machining station (4) until reaching a flange configuration (9) at the first end, when in the machining of the second end of the first crankshaft (5) disposed in the first machining station (3) a flange configuration (9) is reached, the machining of a second end of the second crankshaft (5) disposed in the second machining station (4) until reaching a spike configuration (8) at the second end, the unloading and dismounting of the first crankshaft (5) of the first machining station (3) and the loading and mounting of a new first crankshaft (5) onto the first machining station (3) while the second crankshaft (5) disposed in the second machining station (4) is machined, when in the machining of the second end of the second crankshaft (5) disposed in the second machining station (4) reaches a spike configuration (8), the machining of a second end of the new first crankshaft (5) disposed in the first machining station (3) until reaching a flange configuration (9), when in the machining of the first end of the second crankshaft (5) disposed in the second machining station (4) a flange configuration (9) is reached, machine a first end of the new first crankshaft (5) disposed in the first machining station (3) until reaching a spike configuration (8) and the unloading and dismounting of the second crankshaft (5) of the second machining station (4) and the loading and mounting of a new second crankshaft (5) in the second machining station (4) while the new first crankshaft (5) disposed in the first machining station (3) is machined.

2. The machine for machining crankshaft (5) ends according to claim 1, wherein the first machining head (1) and the second machining head (2) are configured to move in the direction of three orthogonal axes.

3. Machine for machining crankshaft (5) ends according to claim 2, wherein the first machining head (1) and the second machining head (2) are configured to move from a position facing the first machining station (3) towards a position facing the second machining station (4) and vice versa.

4. Machine for machining crankshaft (5) ends according claim 1, wherein the first machining head (1) and the second machining head (2) comprise a tool repository (6).

5. Machine for machining crankshaft (5) ends according claim 1, wherein the first machining station (3) and the second machining station (4) comprise at least one securing element (7) for securing the crankshafts (5).

6. Machine for machining crankshaft (5) ends according to claim 5, wherein at least one end of a securing element (7) is mobile.

7. A process for machining crankshaft (5) ends, the process comprising the steps of:
  i—machining a first end and a second end of a first crankshaft (5) disposed in a first machining station (3) until reaching a spike configuration (8) at the first end and a flange configuration (9) at the second end;
  ii—loading and mounting a second crankshaft (5) in a second machining station (4) while the first crankshaft (5) disposed in the first machining station (3) is being machined;
  iii—when the first machine head machines the first-end of the first crankshaft disposed in the first machining station until reaching a spike configuration, it then machines a first end of the second crankshaft disposed in the second machining station until reaching a flange configuration;
  iv—when the second machine head machines the second end of the first crankshaft disposed in the first machining station until reaching a flange configuration, it then machines a second end of the second crankshaft disposed in the second machining station until reaching a spike configuration;
  v—unloading and dismounting the first crankshaft (5) of the first machining station (3) and loading and mounting a new first crankshaft (5) onto the first machining station (3) while the one second crankshaft (5) disposed in the second machining station (4) is machined;
  vi—when the second machine head machines the second end of the second crankshaft disposed in the second machining station until reaching a spike configuration, it then machines a second end of the new first crankshaft disposed in the first machining station until reaching a flange configuration;
  vii—when the first machining head machines the first end of the second crankshaft disposed in the second machining station until reaching a flange configuration, it then machines a first end of the new first crankshaft disposed in the first machining station until reaching a spike configuration; and
  viii—unloading and dismounting the second crankshaft (5) of the second machining station (4) and loading and mounting of a new second crankshaft (5) onto the second machining station (4) while the new first crankshaft (5) disposed in the first machining station (3) is machined.

8. The process for machining crankshaft (5) ends, according to claim 7, wherein it additionally comprises the stage of repeating steps iii-viii.

* * * * *